(12) United States Patent
Sands

(10) Patent No.: US 7,988,162 B2
(45) Date of Patent: Aug. 2, 2011

(54) AUGER DOLLY (AN ATTACHMENT FOR ALL HANDHELD POWER EARTH AUGERS)

(76) Inventor: Floyd Keith Sands, Altus, OK (US)

( * ) Notice: Subject to any disclaimer, the term of this patent is extended or adjusted under 35 U.S.C. 154(b) by 184 days.

(21) Appl. No.: 12/215,976

(22) Filed: Jul. 1, 2008

(65) Prior Publication Data

US 2009/0283979 A1 Nov. 19, 2009

(51) Int. Cl.
B62B 1/12 (2006.01)
B62B 1/26 (2006.01)

(52) U.S. Cl. .................. 280/79.7; 280/47.29

(58) Field of Classification Search .................. 280/651, 280/652, 47.27, 47.29, 79.7; 175/170, 203, 175/173, 189, 195, 202
See application file for complete search history.

(56) References Cited

U.S. PATENT DOCUMENTS

| | | | |
|---|---|---|---|
| 427,580 A * | 5/1890 | Lamb | 175/84 |
| 1,481,219 A * | 1/1924 | Miller | 173/33 |
| 2,598,489 A * | 5/1952 | Bayer et al. | 414/467 |
| 2,723,835 A * | 11/1955 | Reese et al. | 175/18 |
| 2,903,147 A * | 9/1959 | Davis, Jr. | 414/490 |
| 5,938,396 A * | 8/1999 | Audet | 414/490 |
| 6,125,951 A * | 10/2000 | Bowser | 175/203 |
| 6,364,331 B1 * | 4/2002 | Yap | 280/47.371 |
| 6,921,095 B2 * | 7/2005 | Middleby | 280/47.29 |
| 7,717,195 B2 * | 5/2010 | Paskar | 175/170 |

* cited by examiner

Primary Examiner — John D Walters

(57) ABSTRACT

A rolling dolly like apparatus comprising a longitudinal column of predetermined length, having a rotary mechanism at each end, whereby power is transferred to a move a supportive structure in a parallel direction with said column. At the lower end of said column, a small frame having multiple wheels is attached to the said column by means of a swiveling mechanism. The said supportive structure in configured as to receive the attachment of any type of handheld portable power posthole digger, so that the Auger Dolly and the said attached handheld power posthole digger function in concert with each other, thereby increasing the portability and maneuverability of any handheld power posthole digger, and also thereby eliminating the reverse torque and recoil being exerted on the operator, as well as eliminating the physical stress and danger associated with normal use of any handheld power posthole digger.

1 Claim, 4 Drawing Sheets

AUGER DOLLY (AN ATTACHMENT FOR ALL HANDHELD POWER EARTH AUGERS)

FEDERALLY SPONSORED RESEARCH non applicable

SEQUENCE LISTING OR PROGRAM non applicable

BACKGROUND

1. Field of Invention

Pertaining to the safe and easy transportation and operation of any handheld power posthole digger.

2. Discussion of Prior Art

Many gasoline or electric powered earth boring apparatuses have been designed and developed to reduce the human time and energy required to bore relatively small cylindrical holes in the earth's surface, commonly referred to as postholes. The smallest of these apparatuses are portable power earth augers, commonly referred to as handheld power posthole diggers, comprising a small internal combustion engine, or an electric motor, configured to set on top or, to the side of, and attached to a power transmission mechanism, which is attached to, and rotates an earth auger with substantial force, which when brought into contact with the ground with substantial downward force supplied by the operator, digs into, and removes soil from the earth in a considerably aggressive manner, thereby creating a post hole.

With all handheld power posthole diggers, the operator holds on to, and controls the aggressive and dangerous apparatus by means of handles that extend a distance outward from under the engine or outward from under the transmission mechanism. Although these types of apparatuses can decrease the amount of time it takes to dig a posthole, as opposed to a digging posthole with a hand tool, they do not necessarily decrease the human energy required. Digging a posthole with a handheld power posthole digger actually requires approximately the same amount or human energy as would be required to dig the same posthole using a hand tool. The energy is simply exerted by a much greater number of the operator's muscles, utilizing the operator's whole body to dig a posthole, instead of just his arms and shoulders, as hand tools normally do. However when operating a handheld power posthole digger, the energy is exerted by the operator in a much shorter period of time, and in somewhat of a violent manner. This is what makes the use of a handheld power posthole digger both strenuous and dangerous.

With all handheld power posthole diggers, the reverse torque and recoil produced by the turning auger hitting dirt, rocks and roots is resisted and absorbed totally by the operator's body, which can result in excessive stress, and even personal injury to the operator.

In an effort to overcome these problems, some power posthole diggers have been designed with a special configuration placing the engine and transmission mechanism in a heavy frame, and a substantial distance from the turning auger, with a long, rigid bar or beam connecting the engine and transmission mechanism to the turning auger. With this configuration, the long, rigid bar or beam, attached to the heavy engine and transmission mechanism, holds the resistance against the turning auger.

Such apparatuses provide some measure of safety for the operator, but their proper operation still relies completely on the operator's muscles to push the tuning auger down into the ground to make it dig, and also to pull it up out of the ground during and after the digging process. Each time the operator has to pull the auger up out of the ground, he has to lift the weight of the auger, the weight of the power transfer mechanism on top of the auger, the bar or beam that holds resistance against the turning auger, plus the weight of the dirt that is being removed form the hole.

In addition to this considerable combined weight, here is also considerable friction encountered when pulling an auger out of a posthole that is approximately the same diameter as the auger bit that drilled it. This friction, plus the said combined weight, often requires the operator to exert several hundred pounds of upward force with his legs, arms, shoulders and back to lift the auger and dirt up out of the hole, and the operator must do this repeatedly during the entire digging process to keep clearing the dirt from the auger, to keep it from bogging down the engine, and getting the auger stuck in the ground.

Apparatuses configured with the engine and transmission mechanism set a substantial distance from the turning auger, with the two connected by a long, rigid bar or beam, also require a relatively large turning radius. Their relatively large turning radius, plus their larger size and heavier weight makes them impossible to maneuver into close quarters or confined spaces, and makes them nearly impossible to move over uneven ground or rough terrain.

A variety of smaller, lighter, more portable handheld power posthole diggers have been designed with special handles or special clutch mechanisms to reduce stress and danger to the operator. However, any apparatus with enough power to develop enough rotational force to bore postholes in the earth is definitely powerful enough to be very dangerous, even the ones with a good clutch mechanism.

The smallest of these handheld power posthole diggers are lightweight enough to be carried from place to place by hand, but they are all still very awkward to move and carry from place to place, especially with a 3 ft. long auger bit attached.

In order to carry a handheld power posthole digger in accordance with the manufacturer's specifications and safety instructions, you must shut off the engine after digging each hole before you carry it to the next hole, and then you must restart the engine just before digging the next hole.

OBJECTIVES AND ADVANTAGES (a) to provide a means to greatly increase the portability and maneuverability of a handheld power posthole digger by securely attaching it to the invention, thereby allowing it to be easily rolled from place to place.

(b) to provide a means to hold said handheld power posthole digger securely in place during operation, thereby greatly reducing the stress, shock and recoil danger to the operator.

(c) to provide a means of quickly and easily raising and lowering any handheld power posthole digger during its operation, thereby eliminating the need for the operator to do so manually using his arms and back.

Normal operation of any handheld power posthole digger is very strenuous and notoriously dangerous work. When any handheld power auger is used in accordance with the manufacturer's operating instructions, all of the recoil, stress, shock, jarring and vibration of the steel auger hammering away at dirt, gravel, rocks, roots and debris is absorbed by the operator's muscles, bones and joints. When the rotating auger forcefully hits something substantially solid, like a large rock or root, it can stop very abruptly, creating reverse torque and recoil of the apparatus, and can kick back on the operator, literally throwing him for a serious loop, and in the process, possibly causing serious injury to his thumbs, hands, wrists, elbows, arms, shoulders, ribs, hips, knees, legs or back.

Normal operation of any handheld power posthole digger requires the operator to exert the full strength of his arms, shoulders and upper body to put pressure down on the auger to make it dig, while simultaneously exerting the full strength of those same muscles, plus the full strength of his back and leg muscles to hold resistance against the turning auger.

However, if the auger should start to dig in too much and begins to bog down the engine, which frequently happens, the operator must then use the full strength of his back, shoulders and arms to pull up on the auger to keep it from simply screwing itself into the ground, while simultaneously continuing to exert his full strength to hold resistance against the turning auger.

Normal operation of any of these types of handheld power posthole digger require the operator to keep literally every muscle in his body tense during the entire digging process to keep from losing control of the apparatus and possibly sustaining serious personal injury.

With normal operation of any handheld power posthole digger, when the hole is finally dug the to the desired depth, the operator is completely bent over at the waist with his arms fully extended down to the ground, with every muscle in his body tensed up, and he must pull the weight of the power head, the auger and the dirt up out of the ground with his back and arms, while simultaneously continuing to exert his full strength to hold resistance against the turning auger.

Because there is no reverse on most handheld augers, every time the auger does screw itself into the ground, or gets caught on a root or rock, which happens frequently, the operator must then remove the power head from the auger and screw the auger out by hand or dig it out by hand.

Also, carrying even the smallest handheld power posthole digger from place to place with an auger attached to it can be very awkward and even dangerous, especially when carrying it over obstacles, or over rough or uneven terrain.

However, any handheld gas or electric power posthole digger, when attached to, and working in concert with an Auger Dolly, instantly becomes extremely portable, and very safe and easy to move from place to place as it is rolled about on a small, lightweight frame with multiple wheels or tires 38.

Also, with any handheld power posthole digger, when properly attached to, and operating in concert with an Auger Dolly, the possibility of excessive stress or injury to the operator is totally removed, because all the stress, shock and recoil that may be caused by the auger hitting dirt or solid objects, is absorbed by the Auger Dolly, which is held securely in place by the operator's body weight standing on foot bar, located at the bottom rear of the Auger Dolly.

Also, with any handheld power posthole digger, when properly attached to, and working in concert with an Auger Dolly, the operator can turn the hand crank handle clockwise and utilize the substantial leverage of the chain drive mechanism to put substantial pressure down on the auger to make it dig, but if the auger starts dig too fast and starts to bog down the engine, the operator can also turn the hand crank handle counter clockwise and utilize the substantial leverage of the drive chain mechanism to easily raise the auger out of the ground until the engine gets back up to full speed. Then the operator can resume digging, using the hand crank handle lower the auger slowly and in a very controlled manner, thereby shaving off just a little dirt at a time without bogging down the engine, and possibly getting the auger stuck in the ground.

When using any handheld power posthole digger that is properly attached to and working in concert with an Auger Dolly, when a hole is dug to the desired depth, the operator is not bent over at the waist with his arms fully extended toward the ground as is normal when operating a handheld power posthole digger unaided by an Auger Dolly.

In fact, when using any handheld power posthole digger that is properly attached to an Auger Dolly, the operator does not have to bend over and pull the auger up out of the ground with his arms and back at all, rather the operator stands on the foot bar in an upright and relaxed position. At any time, the operator can easily lift the auger out of the ground by means of the drive chain mechanism and hand crank handle.

The compact and lightweight Auger Dolly also allows the operator to easily roll any properly attached, handheld power posthole digger from place to place with little effort and no danger, even while leaving the engine running in the idle position, so there is no need to restart the engine every time you dig a hole. You can also easily maneuver any attached handheld power posthole digger into close quarters and confined areas, as well as easily move the Auger Dolly and the attached handheld power posthole digger, over curbs, up and down steps, over construction debris, through gullies, up and down hills and over very rough terrain.

Any handheld power posthole digger, when properly attached to, and working in concert with an Auger Dolly becomes a very portable and maneuverable posthole digging apparatus, and turns the very strenuous, difficult and dangerous work of digging postholes into very safe and easy work.

SUMMARY

The Auger Dolly is a rolling dolly apparatus comprising a drive column, having a rotary mechanism at each end, whereby power is transferred to a move a supportive structure in a parallel direction with said column, thereby also moving a properly attached portable gasoline or electric power posthole digger, causing a turning auger to come into contact with the earth at a desired angle and with considerable force, thereby removing soil and making postholes in the earth's surface.

The Auger Dolly, with any handheld power posthole digger properly attached, allows an operator to safely and easily move the power posthole digger from place to place, including over rough terrain, over small obstacles, over curbs, up and down steps, up and down hills, and through gullies.

The Auger Dolly, when properly attached to any handheld power posthole digger, allows an operator to dig postholes in nearly any soil type, and at various desired angles, and completely without stress, shock, recoil, or danger of any kind to the operator, because the resistance is held against the turning auger by the weight of the operator standing on a foot bar located at the lower, backend of the invention.

The Auger Dolly, when properly attached to any handheld power posthole digger, allows an operator to stand upright in a relaxed position, while digging postholes utilizing a hand crank and drive chain mechanism to push the auger into the ground with considerable force. The hand crank and drive chain mechanism also allows the operator to easily lift the auger up out of the ground without having to bend over and manually lift the auger out of the ground with his back, arms and shoulders.

Other objects and advantages of the invention will become readily apparent from consideration of the following description and drawings.

DRAWINGS

Figure 1:
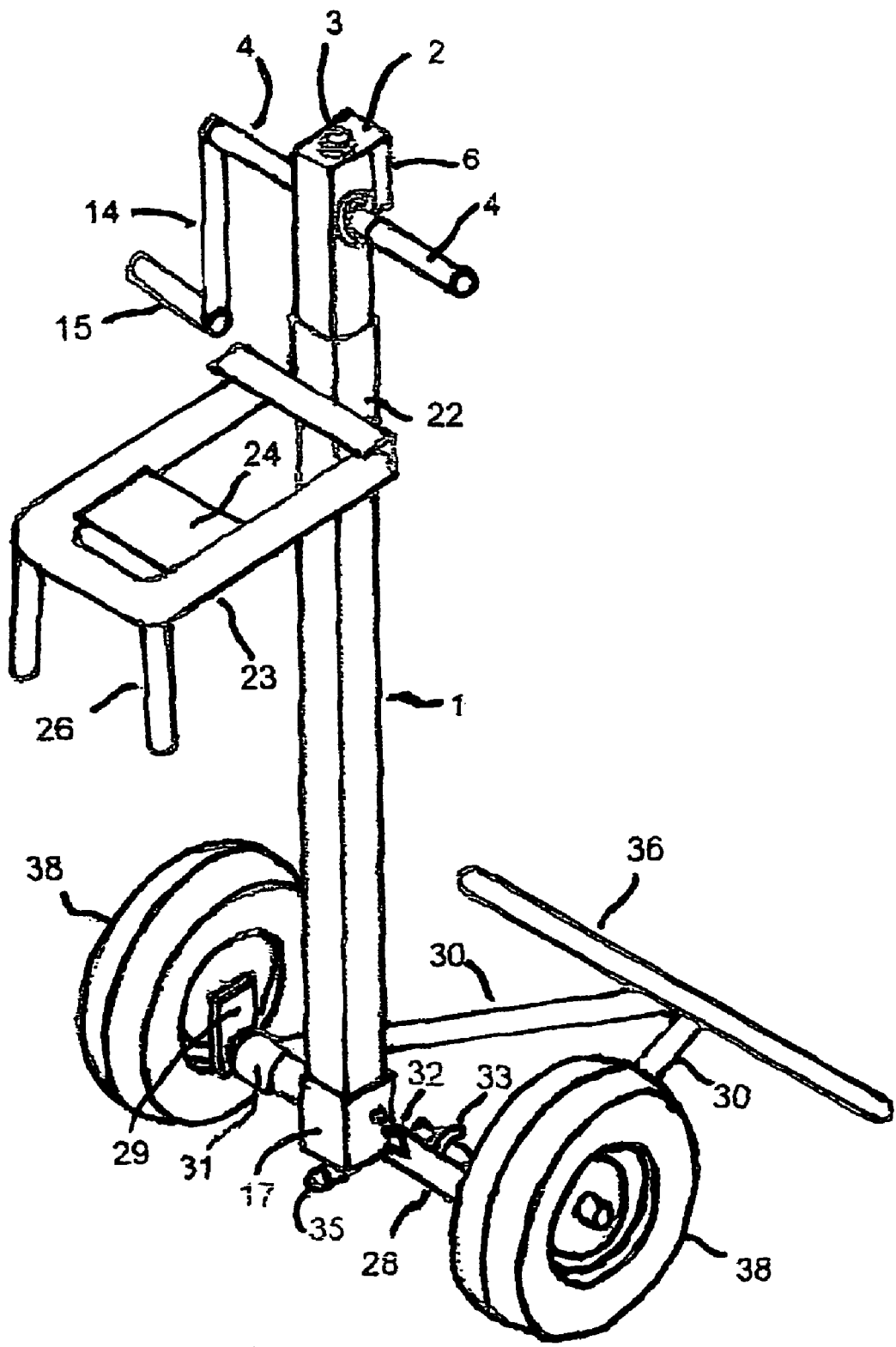
FIG. 1 a perspective view
Figure 2A:
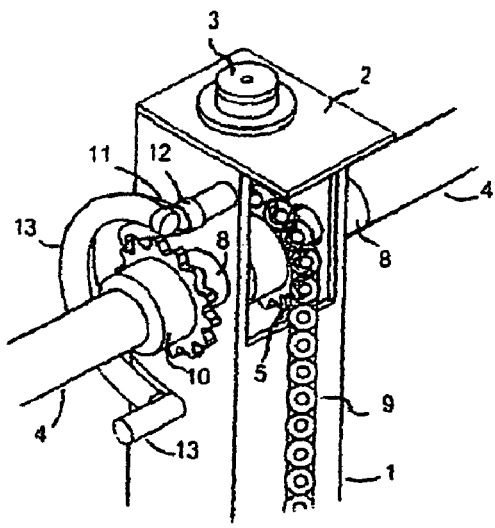
FIG. 2A a perspective view of the top of drive column 1
FIG. 2B a perspective view of the bottom of drive column 1
FIG. 3 a right side view of power head mounting bracket 23
FIG. 3A a left side view of the top of drive column 1
FIG. 4 a top view of axle 28 and attached tail bar assembly
FIG. 4A a front view of axle 28 and attached tail bar assembly
Figure 2B:
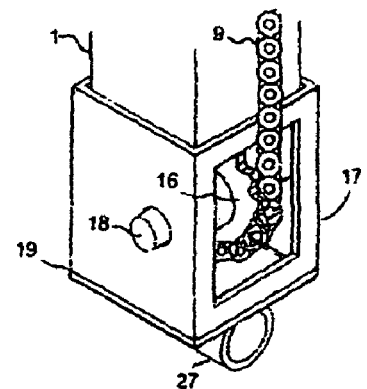
FIG. 2 a back view of the top of drive column 1
Figure 2:
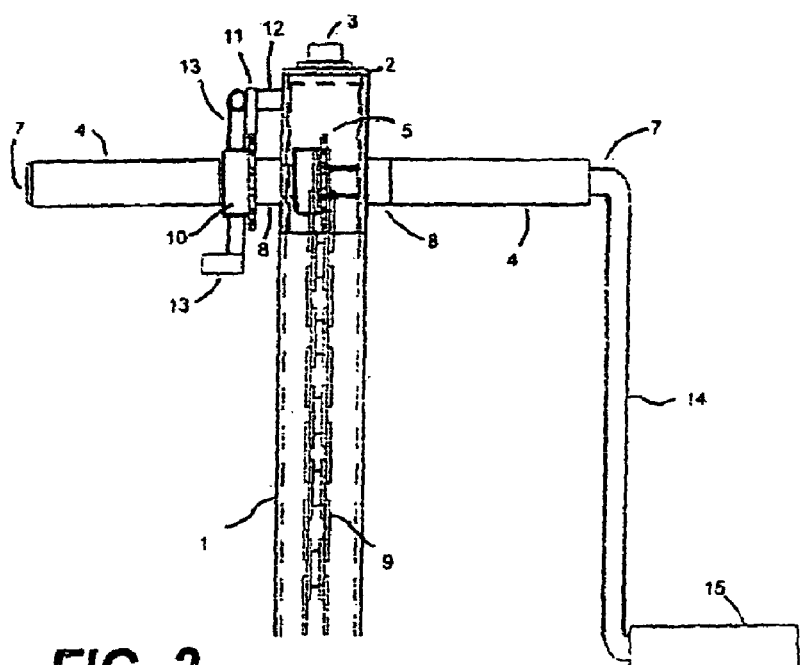
Figures 3, 3A:
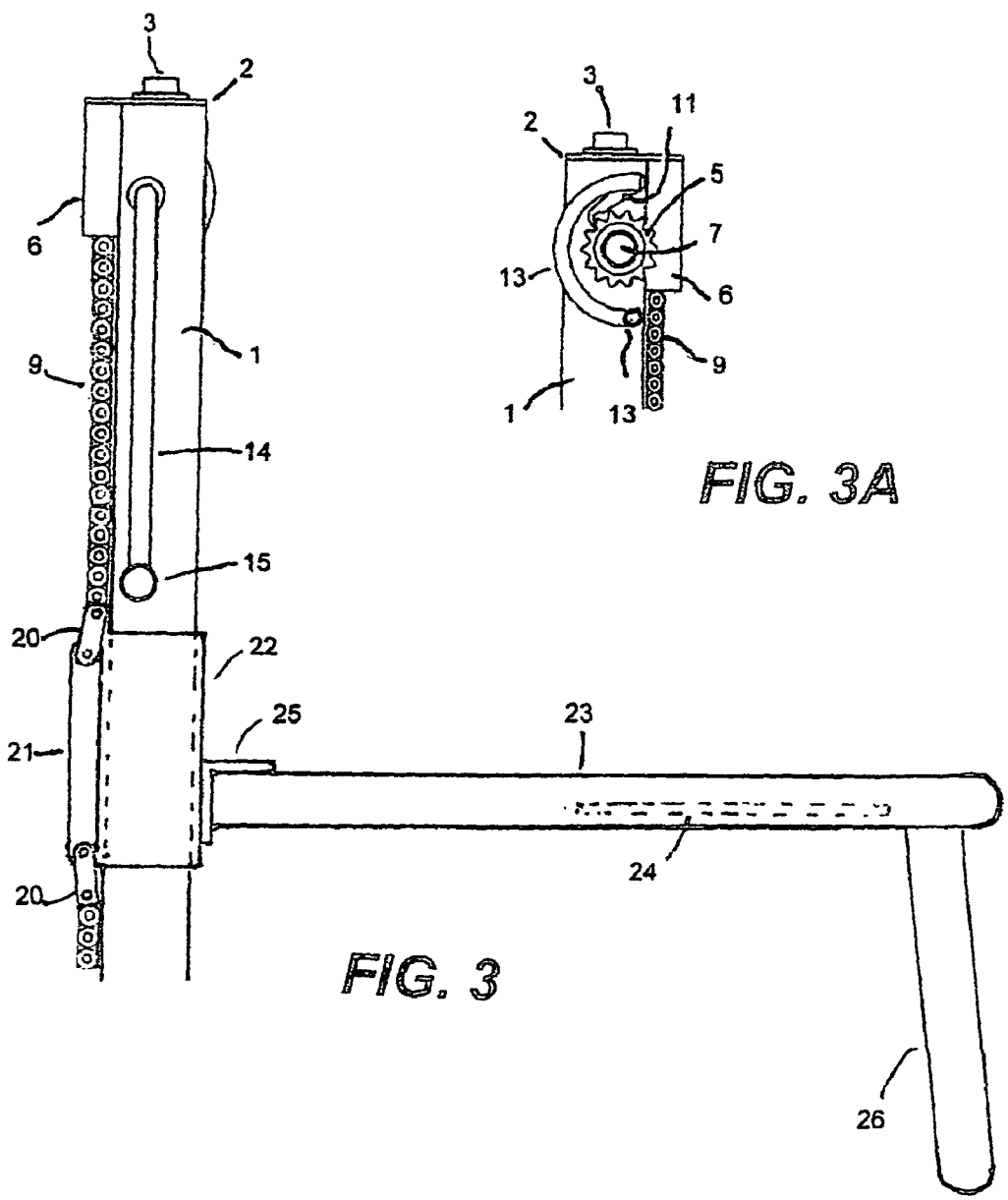
Figure 4:
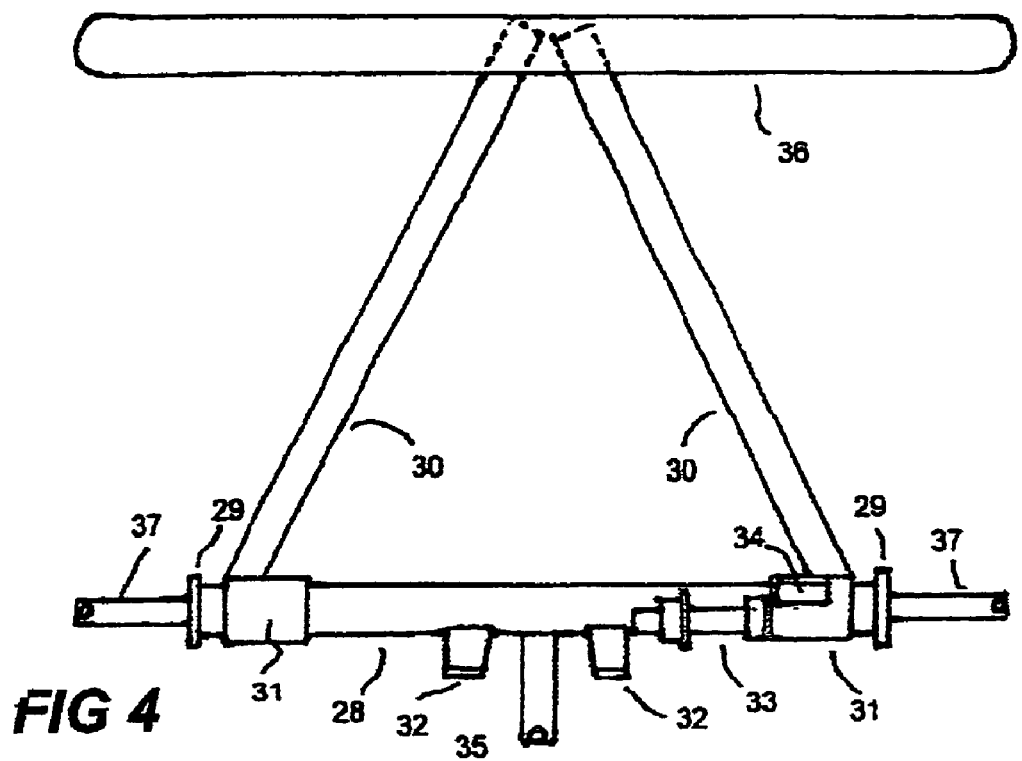
Figure 4A:
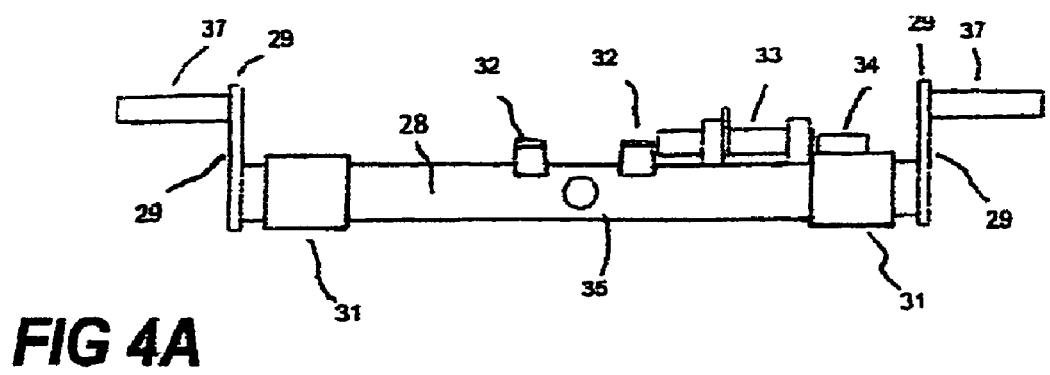

| | |
|---|---|
| 1. | Drive Column |
| 2. | Column Top Cap |
| 3. | Bubble Level |
| 4. | Handle |
| 5. | Top Drive Sprocket |
| 6. | Drive Sprocket Cover |
| 7. | Drive Shaft |
| 8. | Drive Shaft Bushing |
| 9. | Drive Chain |
| 10. | Chain Lock Ratchet Wheel |
| 11. | Ratchet Paw |
| 12. | Ratchet Paw Swivel |
| 13. | Chain Lock Release |
| 14. | Hand Crank Arm |
| 15. | Hand Crank Handle |
| 16. | Bottom Drive Sprocket |
| 17. | Drive Column Reinforcement |
| 18. | Sprocket Pin |
| 19. | Column Bottom Cap |
| 20. | Chain Link |
| 21. | Chain Attachment |
| 22. | Travel Guide |
| 23. | Power Head Mounting Bracket |
| 24. | Mounting Plate |
| 25. | Mounting Bracket Cross Member |
| 26. | Mounting Bracket Support Legs |
| 27. | Swivel Bushing |
| 28. | Axle |
| 29. | Axle Plate |
| 30. | Tail Bar |
| 31. | Tail Bar Swivel Bushing |
| 32. | Lateral Movement Stop |
| 33. | Slide Bolt Latch |
| 34. | Slide Bolt Stop |
| 35. | Swivel Pin |
| 36. | Foot Bar |
| 37. | Wheel Stub |
| 38. | Wheel and tire |

List of Reference Numerals

| | | | |
|---|---|---|---|
| 3,976,147 | August 1976 | Cunningham | 17/26 |
| 4,077,480 | March 1978 | Carlson | 173/22 |
| 4,116,284 | September 1978 | Cox | 173/140 |
| 5,396,967 | March 1995 | Stewart | 175/170 |

DETAILED DESCRIPTION

A rigid drive column 1, is preferably made of a piece of square, steel tubing approximately 2" square and with a wall thickness of approximately 1/8", and approximately 4' long in overall length. A travel guide 22 is constructed of a piece of square tubing approximately 5 inches in length and just slightly larger in size than said drive column 1, whereas to allow said guide 22 to slide freely up and down the length of said column 1. Said guide 22 is slid over the top of said column 1, and then covered on top by a top column cap 2 which is welded to the top of said column 1. A hole is made in both the right and left sides of the top of said column 1, with two identical a drive shaft bushing 8s welded to the outside of said column 1, one on the right side and one on the left side, as to perfectly match said holes which were made in said column 1.

Two identical handle 4s are preferably made of standard 3/4" steel pipe approximately 6" in overall length. Right side handle 4 is then welded to right side said bushing 8. A drive shaft 7, which is preferably made of 1/2" round steel rod and approximately 16" in length, is passed though right said handle 4 and also through right said bushing 8. A top drive sprocket 5 is set inside the top of said column 1, and said shaft 7 is passed through said sprocket 5, and then said shaft 7 is passed on through the left said bushing 8, with said sprocket 5 suspended on said shaft 7, and positioned in the center of said column 1. Said sprocket 5 is then welded to approximately the center of said shaft 7. Said sprocket 5 is positioned inside the top of said column 1 in such a way as to allow said sprocket 5 to protrude slightly from the back of said column 1 through a slot cut into the back of said column 1, allowing a drive chain 9 to roll freely over said sprocket 5, with part of said chain 9 running inside said column 1, and with part of said chain 9 running along the outside back and in a parallel direction with said column 1. A drive sprocket cover 6 is welded to the top backside of said column 1, as a means to shield said sprocket 5 from coming in contact with the hands of any operator of the Auger Dolly.

A bottom drive sprocket 16 is set inside the bottom of said column 1 and is positioned as to allow said sprocket 16 to protrude slightly out of a slot that is cut in bottom backside of said column 1, as to allow said chain 9 to roll freely around said sprocket 16. Said sprocket 16 is held in place by a sprocket pin 18, which passes through said sprocket 18, and said pin 18 is welded into two holes which are made in the bottom right and left side of said column 1. Said sprocket 16 is allowed to rotate freely on said sprocket pin 18. A drive column reinforcement 17, which is made of a piece of square steel tubing only slightly larger than said column 1, and is slipped up over the bottom of said column 1 as a reinforcement for the bottom of said column 1, and is then welded to the bottom of said column 1. A column bottom cap 19 is welded to the bottom of said reinforcement 17, and a swivel bushing 27 is welded to the bottom surface of, and in the center of, said cap 19, in a position to run lengthwise from front to back of said column 1.

Said chain 9 is approximately 8 ft. in length, and one end of said chain 9 is connected to a chain attachment 21, by means of a chain link 20. Said attachment 21 is preferably made from a small piece of steel bar approximately 3/4"×3/16" by 4" in length, with a small hole at each end to allow said link 20 to be attached to it. Said attachment 21 is positioned to run parallel with said guide 22, and is welded to the backside of said guide 22 with the 3/4" width extend outward form the back side of said guide 22. Said chain 9, which is connected to said link 20 located at the top of said attachment 21, and runs upward in a parallel direction with said column 1, and runs into said slot in the top backside of said column 1, and then said chain 9 runs over top of said sprocket 5, and then down though the center of said column 1, and then comes out of said column 1 through the slot in the bottom backside of said column 1, and then runs under the freely rotating sprocket 16, and then running upward in a parallel direction with said column 1, and then running up the out side of the back of said column, until it reaches, and is connected to, said link 20, which is connected to said attachment 21.

A right said handle 4, is welded to the right side bushing 8, with said shaft 7 passing through said right handle 4, with said shaft 7 able to rotate freely within said handle 4. Said drive shaft 7 extends out of right end of said handle 4, and a hand crank arm 14 is welded to said shaft 7 at a 90 degree angle with said shaft 7. A hand crank handle 15 is welded to said crank arm 14 at a 90 degree angle to said crank arm 14. Said crank handle 15, when rotated in a clockwise or counter clockwise direction, is the means by which said chain 9 moves in the same direction as said crank handle 15, thereby also moving the connected said guide 22 in a direction parallel with said column 1. Rotating said crank handle 15 in a clockwise direction moves said guide 22 in an upward direction, and rotating said crank handle 15 in a counter clockwise direction moves said guide 22 in a downward direction.

A chain lock ratchet wheel 10 is slipped over the extended left end of said shaft 7, and positioned next to said bushing 8, which has already been welded to the left side of said column 1. Said ratchet wheel 10 is then welded to said shaft 7. A left said handle 4 is then slipped over the left end of said shaft 7, which allows said shaft 7 to rotate freely inside of left said handle 4.

Said ratchet wheel 10, and said sprocket 5, being both welded to said shaft 7, can only turn in unison and must also stop in unison. A ratchet paw 11, swivels on a ratchet paw swivel 12, and when said paw 11 is engaged with said ratchet wheel 10, said shaft 7 and said chain 9 are locked in position, thereby holding said guide 22 in a stationary position, unable to move in either direction, up or down. A chain lock release 13 is attached to said paw 11, in such a way that when said release 13 is pushed forward by the operator's thumb, said paw 11 is disengaged from said ratchet wheel 10, allowing said shaft 7 to rotate freely, thereby allowing said guide 22 to move up and down the whole length of said column 1.

A power head mounting cross member 25, preferably made of a piece of 1½"×1½" steel angle iron, and approximately 8 inches in length, is welded horizontally across the front of said guide 22. A power head mounting bracket 23, preferably made of a piece of ¾" in diameter pipe approximately 30" in length, is bent in a u shape and with both ends welded to said cross member 25 at a 90 degree angle to said guide 22. A mounting plate 24, is preferably made of ⅛" thick steel plate and is cut to fit inside of said bracket 23, and then welded to said bracket 23.

A bubble lever 3 is attached to the top surface of said cap 2 as a means to determine when the apparatus is setting in a perfectly vertical position.

An axle 28, is preferably made of a piece of standard 1" steel pipe, approximately 16" in length. Two identical tail bar swivel bushing 31s, are preferably made of standard 1¼" steel pipe and approximately 2" in length are slipped over said axle 28.

Two identical axle plate 29s, which are preferably made of ⅜" thick steel plate, measuring approximately 2" wide and 4" long, with said plate 29s being welded flat ways to each end of said axle 28, and in an offset manner. A wheel stub 37 is then welded to each of the said plate 29s, and at a 90 degree angle with the said plate 29s, and also in an offset manner so as to perfectly align both stub 37s with each other, and also running parallel with said axle 28, but not in line with said axle 28. This allows said axle 28 to set lower to the ground when mounted with the appropriate size of two identical wheel and tire 38s.

With said axle 28 hanging as low on said wheel stub 37s, and said wheel and tire 38s, pick a side of said axle 28 to be designated as the front of the said axle 28. Slide the two identical said bushing 31s away from each other and away from the center of said axle 28. A swivel pin 35 is then welded to the center front of said axle 28, between the two said bushing 31s, which are still sliding freely on said axle 28. Weld said pin 35 pointing straight out horizontally and at a 90 degree with said axle 28. Slide the two identical said bushing 31s, each to a different end of said axle 28.

Two identical tail bar 30s, are preferably made of standard ½" steel pipe and are each approximately 17" in over all length, and with the both ends of both said bar 30s flattened in a press. Weld the two identical said bar 30s to the two identical said bushing 31s as to form a triangle with the two said bar 30s and said axle 28. The ends of said bar 30s should meet at a point approximately in the center of said axle 28, and approximately 16" from the back of said axle 28. Weld a foot bar 36 across the top and extreme ends of said bar 30s with said foot bar 36 centered on said bar 30s and arranged so said foot bar 36 runs parallel with said axle 28.

Assemble said pin 35 to said bushing 27 by sliding the back side of said bushing 27, over said pin 35, and push said bushing 27 all the way onto said pin 35, until the back end of said bushing 27 is nearly touching said axle 28. Put a standard clip pin through hole and the end of said pin 35 to secure the said pin 35 to said swivel bushing 27.

Two identical lateral movement stop 32s are preferably made of a piece of ¼" thick steel bar approximately 1" wide and 2" long. Said lateral movement stop 32s are welded to said axle 28, on each side of said column 1, and are arranged in such a way as to limit the lateral movement of said column 1 to move not over approximately 8 degrees from vertical.

A common type of slide bolt latch 33 is welded to the left side of said axle 28, arranged as to allow said latch 33 to slide to the left and engage against a slide bolt stop 34, which is welded to the top of left said bushing 31. Said latch 33 should be arranged on said axle 28 to allow said foot bar 36, along with said tail bar 30s, to be lifted and swiveled upward until it they are folded flat to the back of the said column 1, and held in place by engaging said latch 33. Said latch 33 should also be arranged as to allow said column 1 to lean backward at an angle, allowing said column 1 to rest on said latch 33 when engaged against said stop 34, causing said column 1 to rest in a semi upright position.

Two identical mounting bracket support leg 26s are preferably made of a piece of standard ½" steel pipe approximately 7" in overall length. Two said leg 26s are welded under the front end of said bracket 23, and arranged to point down and slightly forward and slightly toward the outside. Said leg 26s allow the apparatus to stand upright when there is no auger bit attached and said travel guide 22 is all the way at the bottom of said drive column 1.

Once the Auger Dolly is completely assembled, any type or size of handheld power posthole digger can easily be attached to said plate 29, by removing the factory handles that come with the hand held power posthole digger and bolting the handheld power posthole digger to said plate 29, in exactly the same way as it was bolted to the factory handles.

Once any handheld power posthole digger is properly attached to the Auger Dolly, the appropriate throttle cable and handle is preferably bolted on to the back of said cross member 25, or possibly to the top of said bracket 23, or possibly other configurations, which ever is best suited to operate the particular type or brand of handheld power posthole digger. The invention operates in exactly the same way regardless of the type or brand of handheld power posthole digger that is attached to it, or the exact manner in which it is attached.

OTHER EMBODIMENTS (a) a slight modification of said bracket 23 can allow any handheld power posthole digger to be attached to said bracket 23 with the factory handles and throttle that came with the handheld power posthole digger still attached.

OPERATION OF INVENTION

With the Auger Dolly standing in the upright position, place one foot on said foot bar 36, and take hold of either said handle 4 at the top of the Auger Dolly with one hand, and push top of said column 1 forward so as to swivel in said bushing 31s, and then use your other foot to slide said latch 33 to the left to disengage it from said stop 34. With said latch 33 disengaged, said column 1 is free to swivel forward or backward. Lean said column 1 back toward your body until said handle 4 is about waist high and the weight is balanced and easy to hold, then push forward on the Auger Dolly until it begins to roll to where you want it to go, allowing said foot bar to skim along the surface of the ground as you push it forward. When on rough or uneven terrain, raise and swivel said foot bar 36 up and forward until said foot bar 36 is up against said drive column 1, then slide said latch 33 and engage it against said stop 34, which will hold said foot bar 36 in the up position, allowing you to easily move the Auger Dolly, along with the attached power posthole digger, over nearly any terrain, up stairs, and into close quarters. You can push the Auger Dolly forward, or you may pull it backward.

Once you have moved the Auger Dolly to the location that you want to drill a posthole, disengage said latch 33 and allow said foot bar 36 to drop to the ground. Place your feet on said foot bar 36 at about shoulder width, and with the arches of your feet approximately centered on said foot bar 36, firmly holding said foot bar 36 to the ground with your body weight. Then push or pull the top of said column 1 and move it laterally from side to side until said column 1 positioned perfectly vertical, which can be determined by looking at said level 3. You may also drill postholes at what an angle you desire.

Once you have positioned the tip of the auger directly over where you want the posthole, pull on the engine starting rope to start the engine. Once the engine is running at full speed, disengage said release 13, and turn said crank handle 15 in a counter clockwise direction lowering the auger to the ground. Continue to turn said crank handle 15 counter clockwise, thereby putting downward force on the turning auger, and continue doing so until the posthole is the desired depth. Be careful not to put too much pressure down on the auger or you will simply start to lift the Auger Dolly off the ground. If that occurs, lift up on the auger by turning the crank handle clockwise until both tires are on back the ground, and then proceed with digging.

Should you encounter a solid object while digging, such as a tree root, or small rock, simply use said crank handle 15 to lower the auger at a slower rate, allowing the auger to shave off a little of the root at a time until you have gone completely through it, or until the auger has kicked the rock out of the way. Should the auger start to dig in too much and starts to bog down the engine, just turn said crank handle 15 one revolution in a clockwise direction, thereby lifting the auger up slightly, and allowing the engine to get back up to full speed.

Once you have dug the hole to the desired depth, remove your thumb from said release 13 and it will engage into said ratchet wheel 10, allowing said guide 22 to only move in an upward direction. Continue turning said crank handle 15 in a clockwise direction until the auger is completely up out of the ground. Repeat all of these steps and procedures to dig the next posthole.

When you are ready to set the Auger Dolly in the rest position, slide said latch 33 to the left to engage it against said slide bolt stop 34, and allow the drive column to lean backward and to the side, until it rests on said stop 34, and against either said stop 32.

CONCLUSION, RAMIFICATION, AND SCOPE OF INVENTION

The Auger Dolly can be modified to drill holes of a greater depth by increasing the length of said column 1 and said chain 9, and reconfiguring said shaft 7 and said crank handle 15, or by simply building the entire Auger Dolly on a larger scale. The Auger Dolly can also be easily modified to operate in a horizontal position to drill horizontal holes under sidewalks, driveways and other objects.

The Auger Dolly can also be modified to easily attach it to a trailer or to any vehicle by means of a jointed extension arm, or by a jointed square tube that is inserted in the receiver hitch of the towing apparatus on the back of a vehicle.

Said hand crank arm 14, and said crank handle 15 can easily be positioned on the left side of said drive column, for use by left handed operators.

The invention claimed is:

1. A rolling dolly apparatus comprising; a rigid longitudinal drive column, a rotating power transfer mechanism positioned at each end of said longitudinal drive column, a drive shaft mechanism, a hand crank as a means to transfer power, a lateral movement swivel mechanism with limiter mechanism, a front to back swivel mechanism with limiter mechanism, a swiveling foot bar assembly to hold said longitudinal drive column in place and as a means of eliminating reverse rotational torque and recoil created by an auger rotating forcefully against dirt, rocks and tree roots, a slide bolt latch as a means to lock said longitudinal drive column in a semi upright position, or a means to lock foot bar assembly in an up position, an axle assembly with wheels or tires as a means to transport the apparatus from place to place, handles as a means to securely hold on to apparatus during operation and a means to hold on to the apparatus while moving it from place to place, a supportive structure as a means to attach a portable power posthole digger to the apparatus, and a bubble level as a means to determine vertical alignment.

* * * * *